United States Patent
Greene et al.

(10) Patent No.: US 10,691,151 B2
(45) Date of Patent: Jun. 23, 2020

(54) DEVICES AND METHODS FOR DYNAMIC OVERVOLTAGE PROTECTION IN REGULATORS

(71) Applicant: Avago Technologies International Sales Pte. Limited, Singapore (SG)

(72) Inventors: Robert A. Greene, Fort Collins, CO (US); Jacob K. Easter, Fort Collins, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/705,003

(22) Filed: Sep. 14, 2017

(65) Prior Publication Data

US 2019/0079550 A1    Mar. 14, 2019

(51) Int. Cl.
| G05F 1/571 | (2006.01) |
| H02H 9/04 | (2006.01) |
| H02M 1/32 | (2007.01) |
| G05F 1/575 | (2006.01) |
| H02M 3/156 | (2006.01) |
| H02M 1/00 | (2006.01) |

(52) U.S. Cl.
CPC .............. G05F 1/571 (2013.01); G05F 1/575 (2013.01); H02H 9/042 (2013.01); H02M 1/32 (2013.01); H02M 3/156 (2013.01); H02M 2001/0006 (2013.01)

(58) Field of Classification Search
CPC . G05F 1/571; G05F 1/575; G05F 1/56; G05F 1/563; G05F 1/595; G05F 1/569; G05F 1/462; H02M 1/32; H02H 9/042
See application file for complete search history.

(56) References Cited

U.S. PATENT DOCUMENTS

| 6,703,813 | B1 | 3/2004 | Vladislav et al. |
| 8,040,118 | B2 * | 10/2011 | Cho .......... G05F 1/573 323/273 |
| 9,831,764 | B2 * | 11/2017 | Bala .......... H02M 3/06 |
| 2008/0290848 | A1 | 11/2008 | Nguyen |
| 2014/0266091 | A1 | 9/2014 | Zuniga et al. |
| 2017/0317625 | A1 * | 11/2017 | Vera .......... G05F 1/595 |

* cited by examiner

*Primary Examiner* — Gary L Laxton
*Assistant Examiner* — Lakaisha Jackson
(74) *Attorney, Agent, or Firm* — Morgan, Lewis & Bockius LLP

(57) ABSTRACT

A system includes a first transistor having a drain and source connected between a supply voltage and an output of a voltage regulator. A gate of the first transistor receives a first gate voltage. The system includes a second transistor having a drain and source connected between the supply voltage and the drain of the first transistor. The second transistor protects the first transistor from excessive voltage. The system includes a level shifter connected between a gate of the second transistor and a gate of the first transistor. The level shifter produces a level-shifted gate voltage for the second transistor that is based on the first gate voltage and that is proportional to an output load current output at the source of the first transistor.

20 Claims, 4 Drawing Sheets

DEVICES AND METHODS FOR DYNAMIC OVERVOLTAGE PROTECTION IN REGULATORS

FIELD OF THE DISCLOSURE

Example embodiments are generally directed toward devices and methods for dynamic overvoltage protection within regulators (e.g., voltage regulators).

BACKGROUND

Some applications that use regulator circuits require a supply voltage that is much higher than the reliability limits of the process technology in which they are designed. Such circuits must include overvoltage protection to limit the junction voltages for all transistors or other components that would otherwise be subjected to voltage drops beyond the technology's specifications. One example of such a circuit is an active pass gate device commonly used in voltage regulator architectures. This device can be protected from overvoltages by dropping the voltage from the supply to a tolerable range. However, in regulators that support a high dynamic range of output load currents, the voltage drop can vary significantly. For example, the voltage drop at high load currents can be much higher than the voltage drop at low load currents, which can cause the regulator pass gate drain voltage to drop low enough to collapse the device, resulting in a failure of the output of the regulator.

BRIEF DESCRIPTION OF THE DRAWINGS

Inventive concepts are described in conjunction with the appended figures, which are not necessarily drawn to scale.

DETAILED DESCRIPTION

Figure 1:
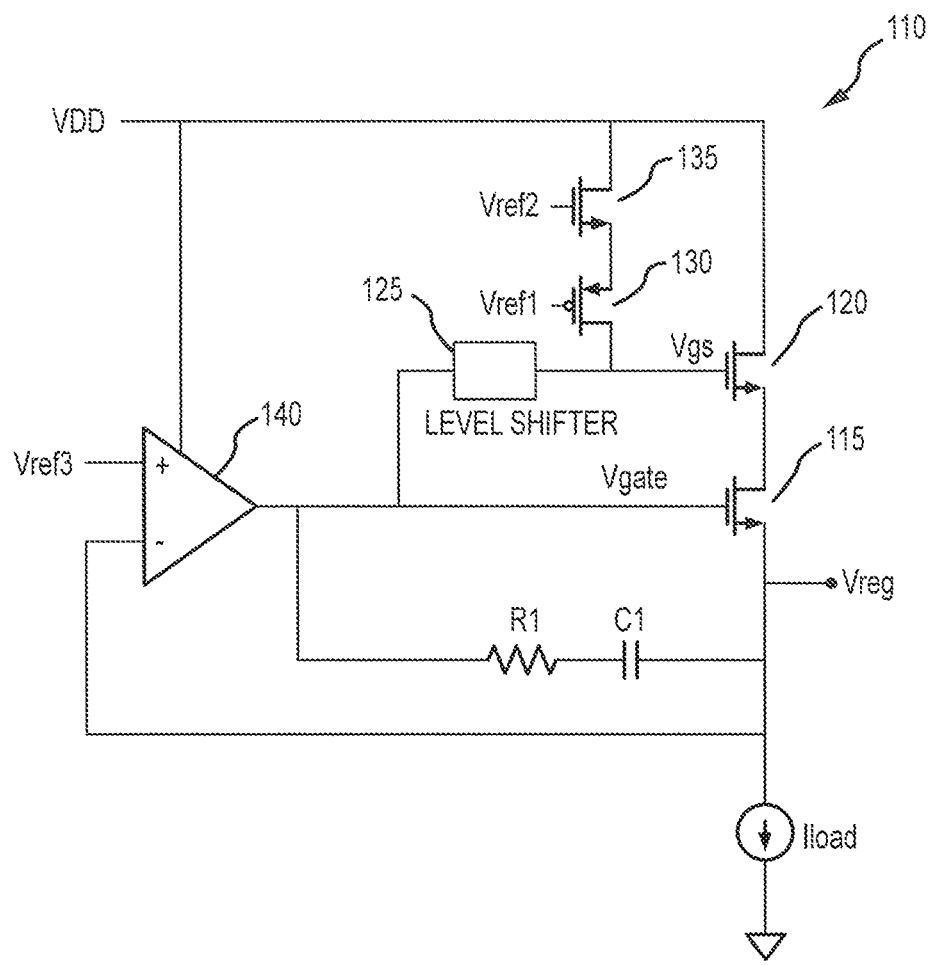
FIG. 1 illustrates an example schematic of a system according to at least one example embodiment.

Example embodiments employ a circuit that dynamically adjusts a cascode device gate voltage based on the magnitude of the regulator output (e.g., output load current). The gate voltage is automatically adjusted such that the cascode device has lower resistance and normalized voltage drop for higher regulator output load current. This circuit normalizes the regulator pass gate drain voltage across a high range of output load currents, keeping the regulator output voltage from collapsing.

Example embodiments provide a cascode device to protect a pass transistor from excessive voltage. Here, the gate voltage of the cascode device is a level-shifted version of a gate voltage Vgate, which is proportional to the output load current of the regulator (Iload). At higher load currents, the cascode device gate bias is increased, which lowers the resistance of the cascode device. Further, the level shifter and the cascode device can be designed such that the voltage drop across cascode device is normalized across the entire range of possible Iload values. One or more other transistors may be included to keep the cascode device protected from overvoltage during the initial ramp up of the supply (VDD). Transient spikes can occur because the supply VDD can ramp faster than the pass gate drive voltage Vgate. The one or more other transistors temporarily provide gate bias for the cascode device during the power supply ramp up.

Other implementations of a high voltage tolerant voltage regulator may have the gate of the cascode device tied to a static reference voltage (e.g., instead of the level shifter). Another approach is to have multiple branches of the cascode device in parallel that are switched in discretely depending on the expected load current or operating mode.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Various aspects of example embodiments will be described herein with reference to drawings that are schematic illustrations of idealized configurations. As such, variations from the shapes of the illustrations as a result, for example, manufacturing techniques and/or tolerances, are to be expected. Thus, the elements illustrated in the drawings are schematic in nature and their shapes are not intended to illustrate the precise shape of an element and are not intended to limit the scope of example embodiments.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "includes," 'including," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

FIG. 1 illustrates an example schematic of a system 110 according to at least one example embodiment.

The system 110 may be a voltage regulator circuit (also referred to as a voltage regulator or regulator). The regulator 110 includes a first transistor (or first switching element) 115 (e.g., NMOS transistor), a second transistor (or second switching element) 120 (e.g., NMOS transistor), at least a third transistor (or third switching element) (e.g., NMOS transistor) 130 and at least a fourth transistor (or fourth switching element) 140 (e.g., PMOS transistor). The regulator 110 further includes a level shifter 125 and a differential circuit element 140 (also referred to as a differential amplifier or comparator). The controller 105 and the regulator 110 are powered by a supply voltage VDD. The regulator 110 outputs a regulated voltage Vreg with an associated load current Iload. In FIG. 1, resistance R1 and capacitance C2 represent load compensation elements to compensate for a high load and a low load on the regulator output.

As shown in FIG. 1, the first transistor 115 is connected between the second transistor 120 and an output Vreg of the voltage regulator 110. For example, the first transistor 115 has a drain and source connected between a supply voltage (or power supply) VDD (via the second transistor 120) and the output Vreg. A gate of the first transistor 115 receives a first gate voltage Vgate.

The second transistor 120 is connected between the supply voltage VDD and the first transistor 115. For example, the second transistor 120 has a drain and source connected between the supply voltage VDD and the drain of the first transistor 115. The second transistor 120, in some embodiments, protects the first transistor 115 from excessive voltage during operation of the regulator 110.

In FIG. 1, the source of the second transistor 120 is connected directly to the drain of the first transistor 115, the source of the first transistor 115 is connected directly to the output of the voltage regulator Vreg/Iload, and the drain of the second transistor 120 is connected directly to the supply voltage VDD. These direct connections provide that the no intermediate circuit components are connected between the direct-connected devices. Another way of viewing this direct connection is that either a bare wire, electrical trace, or shared electrical node is used to connect the direct-connected device. In any event, the electrical potential between the direct-connected devices is nearly or identically the same.

The level shifter 125 is shown to be connected between a gate of the second transistor 120 and a gate of the first transistor 115. In more detail, the level shifter 125 is connected between the gate of the second transistor 120 and an output of the differential circuit 140 (which is also connected to the gate of the first transistor 115). The level shifter 125 is configured to produce a level-shifted gate voltage Vgs for the gate of the second transistor 120. In some embodiments, the level-shifted gate voltage Vgs produced by the level shifter 125 is based on the first gate voltage Vgate and is proportional to an output load current Iload output at the source of the first transistor 115. As a non-limiting example, the level shifter 125 increases a gate bias (i.e., Vgs) of the second transistor 120 in response to an increase in the output load current Iload, thereby lowering a resistance of the second transistor 120. Decreasing the resistance of the second transistor 120 allows more current to flow to the source of the first transistor 115 in order account for the increased load current Iload at the drain of the first transistor 120. This reduces or eliminates the possibility of damage to the first transistor 115 that would normally be caused by the voltage drop across the first transistor 115 as a result of the increased voltage Vreg and/or current Iload.

In another non-limiting example, the level shifter 125 decreases the gate bias Vgs of the second transistor 120 in response to a decrease in the output load current Iload, thereby increasing the resistance of the second transistor 120. Increasing the resistance of the second transistor 120 causes less current to flow to the source of the first transistor 115 in order account for the decreased load current Iload at the drain of the first transistor 120. This reduces or eliminates the possibility of damage to the first transistor 115 that would normally be caused by the voltage drop across the first transistor 115 as a result of the increased voltage Vreg and/or current Iload.

As a result of dynamically adjusting the gate voltage Vgs proportional to the load current Iload, the voltage drop of the second transistor 120 is normalized for higher and lower load currents Iload. This, in turn, normalizes the gate-drain voltage of the first transistor 115 across a wide range of output load currents Iload, which prevents Vreg from collapsing. That is, the level shifter 125 and the second transistor 120 operate together so as to normalize a voltage drop across the second transistor 120 across a range of possible output load current values Iload.

The level shifter 125 may be implemented by any known circuitry capable of shifting an input voltage/current to a higher and/or lower output voltage/current. As can be appreciated, the level shifter 125 may include any device or collection of devices that resolve mixed voltage incompatibility between different parts of a system that operate in multiple voltage domains. The level shifter 125 may correspond to a unidirectional level shifter, a bidirectional level shifter, a direction controller level shifter, a logic level shifter, and/or an application specific level shifter.

As shown in FIG. 1, the regulator 110 includes at least a third transistor 130 and fourth transistor 135 connected between the supply voltage VDD and the gate of the second transistor 120 such that the second transistor 120 is protected from overvoltage during a ramp up of the supply voltage VDD. According to at least one example embodiment, the at least the fourth transistor 135 is connected in series with the at least the third transistor 135. The at least the third transistor 130 has a gate connected to a first reference voltage (or signal) Vref1, and the at least the fourth transistor 135 has its gate connected to a second reference voltage (or signal) Vref2. The first reference voltage Vref1 may be different from the second reference voltage Vref2. As the supply voltage VDD ramps up, the transistors 130 and 135 temporarily provide the gate voltage Vgs to the second transistor 120 to protect the second transistor 120 from overvoltage.

As also shown in FIG. 1, the differential circuit element 140 has an output that is based on a third reference voltage (or signal) Vref3 and the output of the regulator 110. For example, the output of the differential circuit element 140 represents a difference between the Vref3 and the output of the regulator 110. Further, the output of the differential circuit element 140 is connected to the level shifter 125 and the gate of the first transistor 115.

Figure 2A:
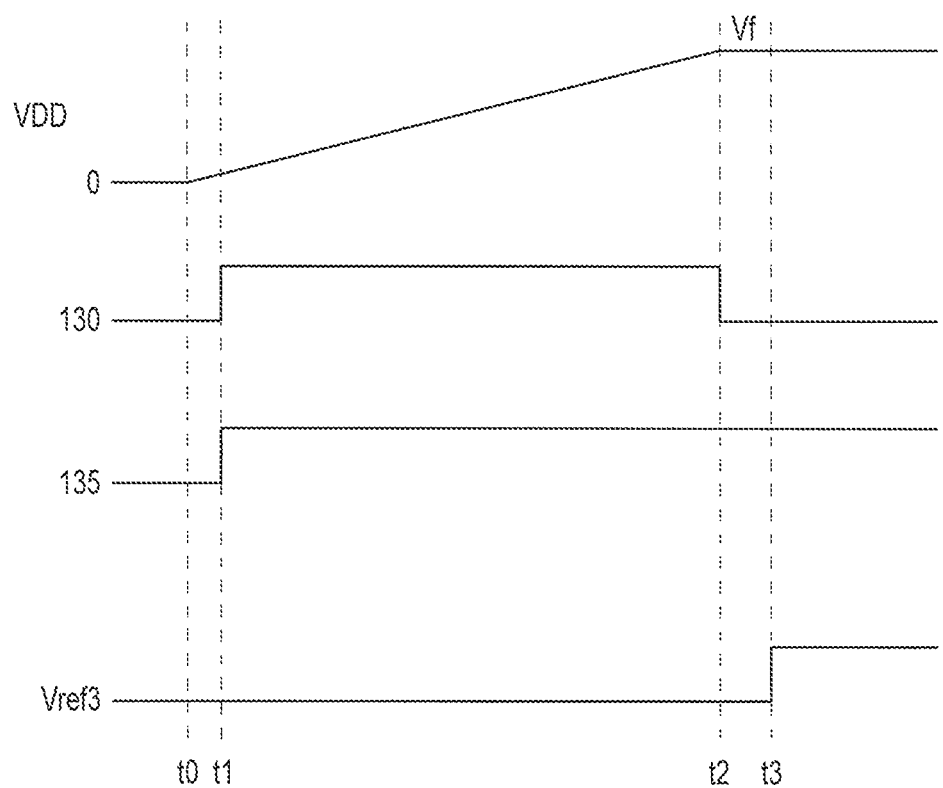
FIGS. 2A and 2B illustrate timing diagrams for the system of FIG. 1 according to at least one example embodiment.

The first reference voltage Vref1 and the second reference voltage Vref2 may be static or dynamic and generated by power supplies that are switched on/off according to a ramp up rate of the supply voltage VDD so that the second transistor 120 is protected from overvoltage. The third reference voltage Vref3 may be static or dynamic and generated by a power supply that is switched on/off according to the on/off timing of the voltages sources Vref1 and/or Vref2. FIG. 2A illustrates additional details of these timings.

It should be understood that example embodiments are not limited to the specific circuit elements shown in FIG. 1 and that equivalent circuit elements/components may be substituted for those elements shown in FIG. 1. For example, a transistor may be replaced with another known switching device that operates the same as or similar to the transistor.

Figure 2B:
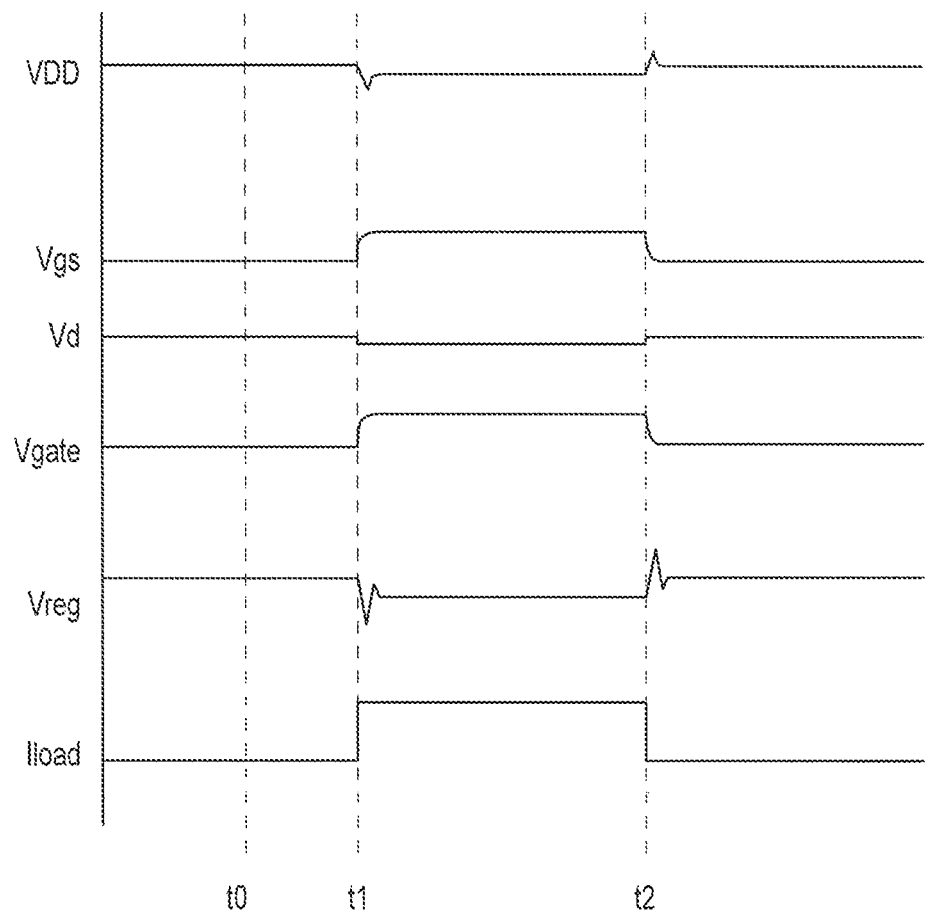

FIGS. 2A and 2B illustrate timing diagrams for the regulator 110 of FIG. 1 according to at least one example embodiment. In more detail, FIG. 2A shows a timing diagram during ramp up of VDD while FIG. 2B shows a timing diagram during normal operation of the regulator 110 (i.e., after VDD has reached a final voltage Vf).

At time t0, the voltage supply VDD begins to ramp up to a final voltage Vf.

At time t1, the present value of VDD and the values of Vref1 and Vref2 cause both of the third and fourth transistors 130 and 135 to turn ON. As VDD increases from time t1 to time t2, the third transistor 130 (being a PMOS transistor) acts as a capacitor to gradually build up voltage at the gate of the second transistor 120, effectively protecting the second transistor 120 from overvoltage during the ramp up of VDD.

At time t2, the voltage supply VDD reaches its final voltage Vf. Here, the values of the final voltage Vf and reference voltage Vref1 and the intrinsic properties of the third transistor 130 cause the third transistor 130 to turn OFF. That is, the value of Vf at a node between the third transistor 130 and the fourth transistor 135 and the value of Vref1 are such that the gate-to-source voltage of the third transistor 130 is greater than the threshold voltage of the third transistor 130, which causes the third transistor 130 to enter the cut-off region (i.e., turn OFF).

At time t3, Vref3 is activated and applied to an input of the differential circuit element 140. Now, the regulator 110 is ready for normal operation to output Iload, and where the second transistor 120 receives a gate voltage Vgs that is a level shifted version of the output from differential circuit element 140 (i.e., level shifter by the level shifter 125) and where the first transistor 115 receives a gate voltage from the output of the differential circuit element 140.

Although the time at which the supply voltage VDD reaches its final voltage Vf is different from the time at which Vref3 is activated, it should be understood that these events may occur simultaneously if desired. That is, the event at time t3 may shift to time t2 if desired.

Further, it should be understood that values of Vref1, Vref2, and/or Vref3 are design parameters set based on empirical evidence and/or user preference. For example, Vref1, Vref2, and Vref3 are constant voltage signals. Further, the amount of time between t0, t1, t2, and/or t3 may be varied according to design preferences and/or tolerances of circuit elements within the regulator 110.

FIG. 2B shows a timing diagram during normal operation of the regulator 110. With reference FIG. 1, FIG. 2B shows the relationships between VDD, Vgs (the gate voltage of the second transistor 120), Vd (the drain voltage of the second transistor 120), Vgate (the gate voltage of the first transistor 115), Vreg, and Iload.

At time t0, the load current Iload is a constant (low) value while VDD, Vgs, Vd, Vgate, and Vreg are also constant.

At time t1, the load current Iload increases (e.g., due to a change in the load connected to the regulator 110). Here, Vgs rises to a value that corresponds to the level shifted output of the level shifter 125 to protect the first transistor 115 from overvoltage, and Vgate rises to a value that corresponds to the output of the differential circuit element 140. The drain voltage Vd dips slightly at time t1. The regulator output voltage Vreg and the supply voltage VDD dip momentarily as a result of the increased load current Iload, but quickly return to a constant level.

Between time t1 and time t2 (i.e., when Iload is high), Vreg is maintained at or near the value at time t0 and does not collapse, meaning that the first transistor 115 has been protected from the spike in the load current Iload. Without such protection from the second transistor 120, Vreg collapses to a level that may render the load connected to the regulator 110 inoperable.

At time t2, the load current Iload falls to a lower level (e.g., the same level as at time t0) as a result in a change of the load connected to the regulator 110, which causes a corresponding decrease in Vgs and Vgate. At the same time, Vd rises slightly (e.g., to the same level as at time t0). VDD and Vreg rise momentarily before returning to constant values (e.g., the same values as at time t0).

It should be appreciated that the momentary lowering and raising of VDD and Vreg at times t1 and t2 are caused by the finite response time of the differential circuit element 140 (i.e., the differential circuit element 140 takes a small amount of time t0 process the inputs and generate an output).

In view of FIGS. 1-2B, it may be said that the voltage regulator circuit 110 comprises an input that receives a supply voltage VDD and an output that provides a regulator output Iload/Vreg. The voltage regulator circuit 110 further includes a transistor connected 115 between the input and the output, and a cascode device 120 having a gate voltage Vgs that is dynamically adjusted based on a magnitude of the regulator output Iload/Vreg to protect the transistor 115 from excessive voltage. The voltage regulator circuit 110 further includes one or more transistors 130/135 connected between the input and the cascode device 120 to protect the cascode device 120 from overvoltage conditions during ramp up of the supply voltage VDD.

The gate voltage of the cascode device 120 is dynamically adjusted by a level shifter 125 that is connected to a gate of the transistor 115 and which produces a level-shifted version of the gate voltage Vgate at the gate of the transistor 115. For example, a gate bias of the cascode device 120 is increased by the level shifter 125 in response to a detected increase of the magnitude of the regulator output Iload/Vreg. In another example, the gate bias of the cascode device 120 is decreased by the level shifter 125 in response to a detected decrease of the magnitude of the regulator output Iload/Vreg. That is, the level shifter 125 and cascode device 120 operate together so as to normalize a voltage drop across the cascode device 120 across a range of possible regulator outputs Iload/Vreg.

Further, the one or more transistors comprise a pair of transistors 130/135 having different reference voltages Vref1/Vref2 provided to respective gates of the pair of transistors 130/135. According to at least one example, the pair of transistors include a first transistor 130 of a first type connected in series to a second transistor 135 of a second type, different than the first type. For example, the pair of transistors are an NMOS transistor 135 connected in series with a PMOS transistor 130.

The voltage regulator circuit 110 also includes a differential circuit element 140 that measures a difference between the regulator output Iload/Vreg and a reference voltage Vref3 and adjusts a gate voltage Vgate of the gate of the transistor 115 in response to the measured difference.

Figure 3:
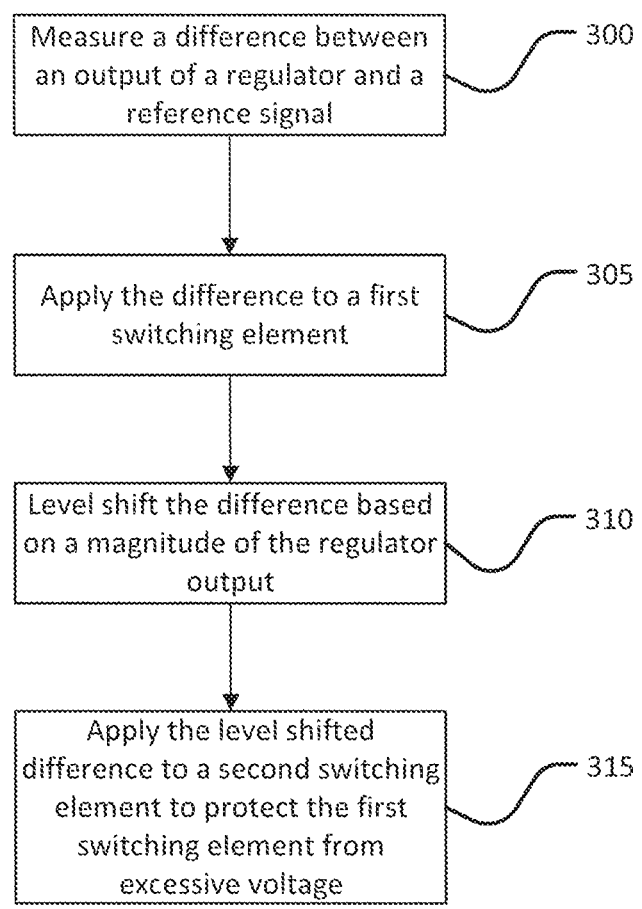
FIG. 3 illustrates example operations for operating the system described with respect to FIGS. 1-2B.

FIG. 3 illustrates example operations for operating the regulator 110 described with respect to FIGS. 1-2B. While a general order for the steps of the method is shown in FIG. 3, the method can include more or fewer steps or can arrange the order of the steps differently than those shown in FIG. 3. Generally, the method starts at operation 300 and ends at operation 315. The method can be executed as a set of computer-executable instructions executed by a computer system and encoded or stored on a computer readable medium. Alternatively, the operations discussed with respect to FIG. 3 may be implemented by the various elements of the regulator 110 described with respect to FIGS. 1-2B. Hereinafter, the FIG. 3 shall be explained with reference to the systems, components, assemblies, devices, user interfaces, environments, software, etc. described in conjunction with FIGS. 1-2B.

In operation 300, the differential circuit element 140 measures a difference between an output Iload/Vreg of the regulator circuit 110 and a reference signal (e.g., Vref3).

In operation 305, the measured difference is applied to a first switching element that is connected to the output. The first switching element switches based on the measured difference.

In operation 310, the level shifter 125 levels shifts the measured difference based on a magnitude of the output Iload/Vreg. For example, the level shifter 125 shifts the measured difference proportional to the magnitude of the output Iload/Vreg.

In operation 315, the level shifter 125 applies the level shifted difference to a second switching element to protect the first switching element from excessive voltage. That is, the second switching element switches based on the level-shifted difference to protect the first switching element from excessive voltage.

According to at least one example embodiment, the first switching element is a first transistor 115 and the second switching element is a second transistor 120. As shown in FIG. 1, the first transistor 115 is connected between the second transistor 120 and the output Iload/Vreg and has a gate that receives the measured difference. The second transistor 120 is connected between the first transistor 115 and a power supply VDD and has a gate that receives the level-shifted difference.

In view of the foregoing description, it should be appreciated that example embodiments dynamically and automatically compensate for changing regulator output (e.g., load current) over a very wide range. Thus, there is no requirement to switch the regulator into different modes depending on the expected load current, and the load current is effectively sensed in real time while the circuit continuously adjusts the voltage protection cascode device. Example embodiments are useful for designs in which the main power supply voltage is higher than the process technology voltage limits.

As can be appreciated, any of the devices depicted and described herein may be implemented as on-chip solutions (e.g., as a single silicon wafer). In at least one example embodiment, the devices may be implemented in an Integrated Circuit (IC) chip having other circuit elements provided therein.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring example embodiments.

While illustrative embodiments have been described in detail herein, it is to be understood that inventive concepts may be otherwise variously embodied and employed, and that the appended claims are intended to be construed to include such variations, except as limited by the prior art.

The invention claimed is:

1. A system, comprising:
a first transistor having a drain and source connected between a supply voltage and an output of a voltage regulator, wherein a gate of the first transistor receives a first gate voltage;
a second transistor having a drain and source connected between the supply voltage and the drain of the first transistor, wherein the second transistor protects the first transistor from excessive voltage; and
a level shifter connected between a gate of the second transistor and a gate of the first transistor, wherein the level shifter produces a level-shifted gate voltage for the second transistor that is based on the first gate voltage and that is proportional to an output load current output at the source of the first transistor.

2. The system of claim 1, wherein the level shifter increases a gate bias of the second transistor in response to an increase in the output load current, thereby lowering a resistance of the second transistor.

3. The system of claim 2, wherein the level shifter decreases the gate bias of the second transistor in response to a decrease in the output load current, thereby increasing the resistance of the second transistor.

4. The system of claim 1, wherein the level shifter and second transistor operate together so as to normalize a voltage drop across the second transistor across a range of possible output load current values.

5. The system of claim 1, wherein the source of the second transistor is connected directly to the drain of the first transistor, wherein the source of the first transistor is connected directly to the output of the voltage regulator, and wherein the drain of the second transistor is connected directly to the supply voltage.

6. The system of claim 1, further comprising:
at least a third transistor connected between the supply voltage and the gate of the second transistor such that the second transistor is protected from overvoltage during a ramp up of the supply voltage.

7. The system of claim 6, further comprising:
at least a fourth transistor connected in series with the at least a third transistor, wherein the at least a third transistor has a gate connected to a first reference voltage, and wherein the at least a fourth transistor has its gate connected to a second reference voltage that is different from the first reference voltage.

8. The system of claim 1, further comprising:
a differential circuit element having an output that is based on a third reference voltage and the output load current, wherein the output of the differential circuit element is connected to the level shifter and the gate of the first transistor.

9. A voltage regulator circuit, comprising:
an input that receives a supply voltage;
an output that provides a regulator output;
a transistor connected between the input and the output;
a cascode device having a gate voltage that is dynamically adjusted based on a magnitude of the regulator output to protect the transistor from excessive voltage; and
one or more transistors connected between the input and the cascode device to protect the cascode device from overvoltage conditions during ramp up of the supply voltage.

10. The voltage regulator circuit of claim 9, wherein the gate voltage of the cascode device is dynamically adjusted by a level shifter that is connected to a gate of the transistor and which produces a level-shifted version of the gate voltage at the gate of the transistor.

11. The voltage regulator circuit of claim 10, wherein a gate bias of the cascode device is increased by the level shifter in response to a detected increase of the magnitude of the regulator output.

12. The voltage regulator circuit of claim 11, wherein the gate bias of the cascode device is decreased by the level shifter in response to a detected decrease of the magnitude of the regulator output.

13. The voltage regulator circuit of claim 10, wherein the one or more transistors comprise a pair of transistors having different reference voltages provided to respective gates of the pair of transistors.

14. The voltage regulator circuit of claim 13, wherein the pair of transistors is an NMOS transistor connected in series with a PMOS transistor wherein the NMOS and PMOS transistor are turned on during ramp up of a supply voltage that powers the cascode device, and wherein the PMOS transistor turns off when the supply voltage reaches a desired level.

15. The voltage regulator circuit of claim 10, wherein the level shifter and cascode device operate together so as to normalize a voltage drop across the cascode device across a range of possible regulator outputs.

16. The voltage regulator circuit of claim 9, further comprising:
   a differential circuit element that measures a difference between the regulator output and a reference voltage and adjusts a gate voltage of the gate of the transistor in response to the measured difference.

17. A regulator circuit, comprising:
   a differential circuit element that measures a difference between an output of the regulator circuit and a reference signal;
   a first switching element that switches based on the measured difference and that is connected to the output;
   a level shifter to level shift the measured difference based on a magnitude of the output; and
   a second switching element that switches based on the level-shifted difference to protect the first switching element from excessive voltage.

18. The regulator circuit of claim 17, wherein the first switching element is a first transistor and the second switching element is a second transistor, wherein the first transistor is connected between the second transistor and the output and has a gate that receives the measured difference, and wherein the second transistor is connected between the first transistor and a power supply and has a gate that receives the level-shifted difference.

19. The regulator circuit of claim 18, further comprising:
   at least a third switching element and a fourth switching element connected between the gate of the second transistor and the power supply and that protects the second transistor from an overvoltage condition during ramp up of the power supply.

20. The regulator circuit of 19, wherein the third switching element and the fourth switching element comprise a third transistor of a first type connected in series with a fourth transistor of a second type, different from the first type.

* * * * *

UNITED STATES PATENT AND TRADEMARK OFFICE
CERTIFICATE OF CORRECTION

PATENT NO. : 10,691,151 B2
APPLICATION NO. : 15/705003
DATED : June 23, 2020
INVENTOR(S) : Robert A. Greene et al.

Page 1 of 1

It is certified that error appears in the above-identified patent and that said Letters Patent is hereby corrected as shown below:

In the Claims

Column 8, Line 67 (Claim 14): "transistor wherein" should read, --transistor, wherein--.

Signed and Sealed this
Twenty-fifth Day of August, 2020

Andrei Iancu
*Director of the United States Patent and Trademark Office*